(12) United States Patent
Humphrey et al.

(10) Patent No.: US 10,145,377 B2
(45) Date of Patent: Dec. 4, 2018

(54) CANNED MOTOR PUMP THRUST SHOE HEAT SHIELD

(71) Applicant: CURTISS-WRIGHT ELECTRO-MECHANICAL CORPORATION, Cheswick, PA (US)

(72) Inventors: Robert Miles Humphrey, Pittsburgh, PA (US); Christopher Daniel Champion, Allison Park, PA (US); Russ Daniel Dilley, Glenshaw, PA (US)

(73) Assignee: CURTISS-WRIGHT ELECTRO-MECHANICAL CORPORATION, Cheswick, PA (US)

( * ) Notice: Subject to any disclaimer, the term of this patent is extended or adjusted under 35 U.S.C. 154(b) by 682 days.

(21) Appl. No.: 15/079,120

(22) Filed: Mar. 24, 2016

(65) Prior Publication Data

US 2016/0290339 A1   Oct. 6, 2016

Related U.S. Application Data

(60) Provisional application No. 62/142,189, filed on Apr. 2, 2015.

(51) Int. Cl.
| | |
|---|---|
| F04D 13/06 | (2006.01) |
| F16C 17/06 | (2006.01) |
| F04D 1/00 | (2006.01) |
| F04D 29/041 | (2006.01) |
| F04D 29/58 | (2006.01) |

(52) U.S. Cl.
CPC ........... *F04D 13/0606* (2013.01); *F04D 1/00* (2013.01); *F04D 13/0633* (2013.01); *F04D 29/0413* (2013.01); *F04D 29/5893* (2013.01); *F16C 17/06* (2013.01)

(58) Field of Classification Search
CPC .............................. F16C 17/06; F04D 13/0633
See application file for complete search history.

(56) References Cited

U.S. PATENT DOCUMENTS

| | | | |
|---|---|---|---|
| 2,888,878 A | 6/1959 | Cobb | |
| 3,013,500 A | 12/1961 | Bollibon et al. | |
| 4,699,524 A | 10/1987 | Bath | |
| 4,886,430 A | 12/1989 | Veronesi et al. | |
| 4,932,836 A | 6/1990 | Boster | |
| 5,024,452 A | 6/1991 | Bice | |
| 5,035,519 A | 7/1991 | Aizawa et al. | |

(Continued)

FOREIGN PATENT DOCUMENTS

JP   6430925   2/1989

OTHER PUBLICATIONS

International Search Report and Written Opinion of International Application No. PCT/US16/24625 dated Jul. 21, 2016.

*Primary Examiner* — Thomas R Hannon
(74) *Attorney, Agent, or Firm* — Pearne & Gordon LLP

(57) ABSTRACT

A heat shield for a thrust bearing assembly of a pump. The heat shield includes a member having an inner surface and an outer surface. A raised flange is formed on a perimeter of the inner surface. The raised flange is configured to seal with a back surface of a thrust shoe holder, and form a cavity between the inner surface and the back surface of the thrust shoe holder. At least one weep hole is on the flange. The weep hole is configured to allow water to enter the cavity to form an insulating stagnant water layer.

22 Claims, 7 Drawing Sheets

(56) References Cited

U.S. PATENT DOCUMENTS

| | | | |
|---|---|---|---|
| 5,356,273 | A | 10/1994 | Nixon |
| 5,927,860 | A | 7/1999 | Buse |
| 6,068,455 | A | 5/2000 | Cowans |
| 6,328,541 | B1 | 12/2001 | Veronesi et al. |
| 6,358,000 | B1 | 3/2002 | Veronesi et al. |
| 7,261,300 | B2 | 8/2007 | Agrawal et al. |
| 8,439,567 | B1 | 5/2013 | Armentrout et al. |
| 8,590,419 | B2 | 11/2013 | Finegan et al. |
| 8,764,378 | B2 * | 7/2014 | Rasmussen ......... F04D 29/0413 384/243 |
| 2013/0121453 | A1 | 5/2013 | Shargots et al. |

* cited by examiner

CANNED MOTOR PUMP THRUST SHOE HEAT SHIELD

CROSS-REFERENCE TO RELATED APPLICATION

This application claims the benefit under 35 U.S.C. § 119(e) of the earlier filing date of U.S. Provisional Patent Application No. 62/142,189 filed on Apr. 2, 2015, the disclosure of which is incorporated by reference herein.

BACKGROUND

This application discloses an invention which is related, generally and in various embodiments, to canned reactor coolant pumps.

In pressurized water nuclear power plants, a reactor coolant system is used to transport heat to steam generators for the production of steam. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant from the reactor core to steam generators for the production of steam. The steam is then used to drive: a turbine generator. The reactor coolant pump typically is a vertical, single stage, centrifugal pump designed to move large volumes of reactor coolant.

During reactor coolant pump thermal transient events, water flowing over the back side of the thrust bearing shoe holder will cause an uneven temperature gradient through the shoe holder resulting in distortion of the thrust bearing shoe during the thermal transient. This thrust bearing distortion may cause rupture of the bearing water film resulting in failure of the bearing.

BRIEF DESCRIPTION OF THE DRAWINGS

For the invention to be clearly understood and readily practiced, the invention will be described in conjunction with the following FIGS., wherein like reference characters designate the same or similar elements, which FIGS. are incorporated into and constitute a part of the specification, wherein.

DETAILED DESCRIPTION

Figure 1:
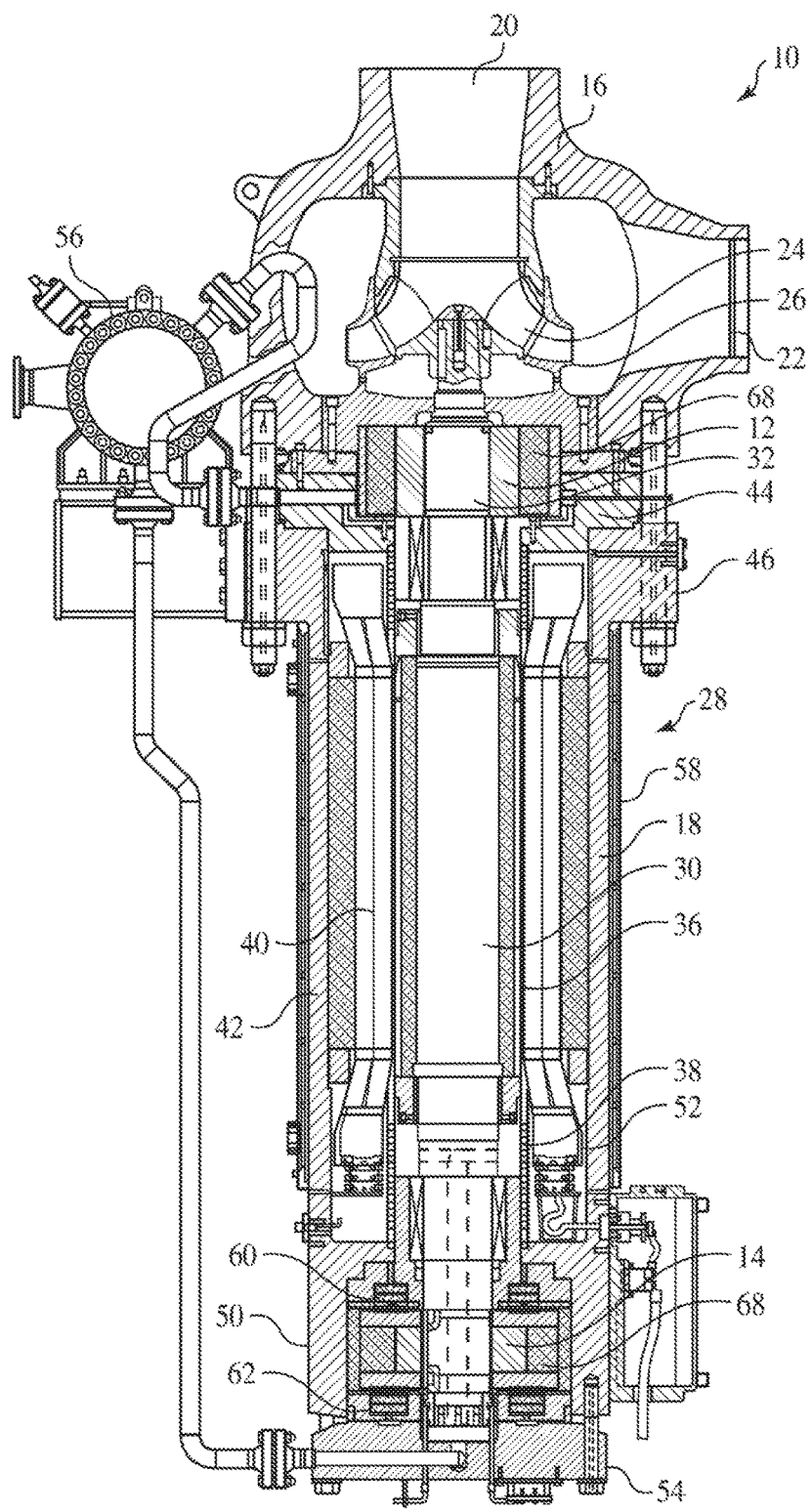
FIG. 1 is a side view, partially in cross-section, of a reactor coolant pump system having a number of flywheels incorporated therein.

Referring to FIG. 1, there is illustrated a reactor coolant pump generally designated by reference numeral 10 having a first or upper flywheel 12 and a second or lower flywheel 14 incorporated into a casing 16 and stator assembly 18 thereof. Pump 10 operates to circulate coolant fluid such as water. Pump casing 16 defines a suction nozzle 20 and a discharge nozzle 22. An impeller 24 is provided for centrifugally pumping the coolant fluid such that fluid is drawn through the suction nozzle 20, through an eye of the impeller 24, discharged through a diffuser 26 and out through the discharge nozzle 22.

Pump 10 further includes a motor 28 having a rotor assembly 30 mounted on a rotatably operable shaft 32 and the corresponding stator assembly 18. Rotor assembly 30 includes shaft 32 and rotor can 36. Stator assembly 18 includes stator can 38, stator coils 40, stator shell 42, stator closure ring 44, stator main flange 46, a stator lower flange 50, stator end turns 52 and stator cap 54. Pump 10 also includes an external heat exchanger 56 and stator cooling jacket 58 for removing heat generated within the pump 10.

Figure 2:
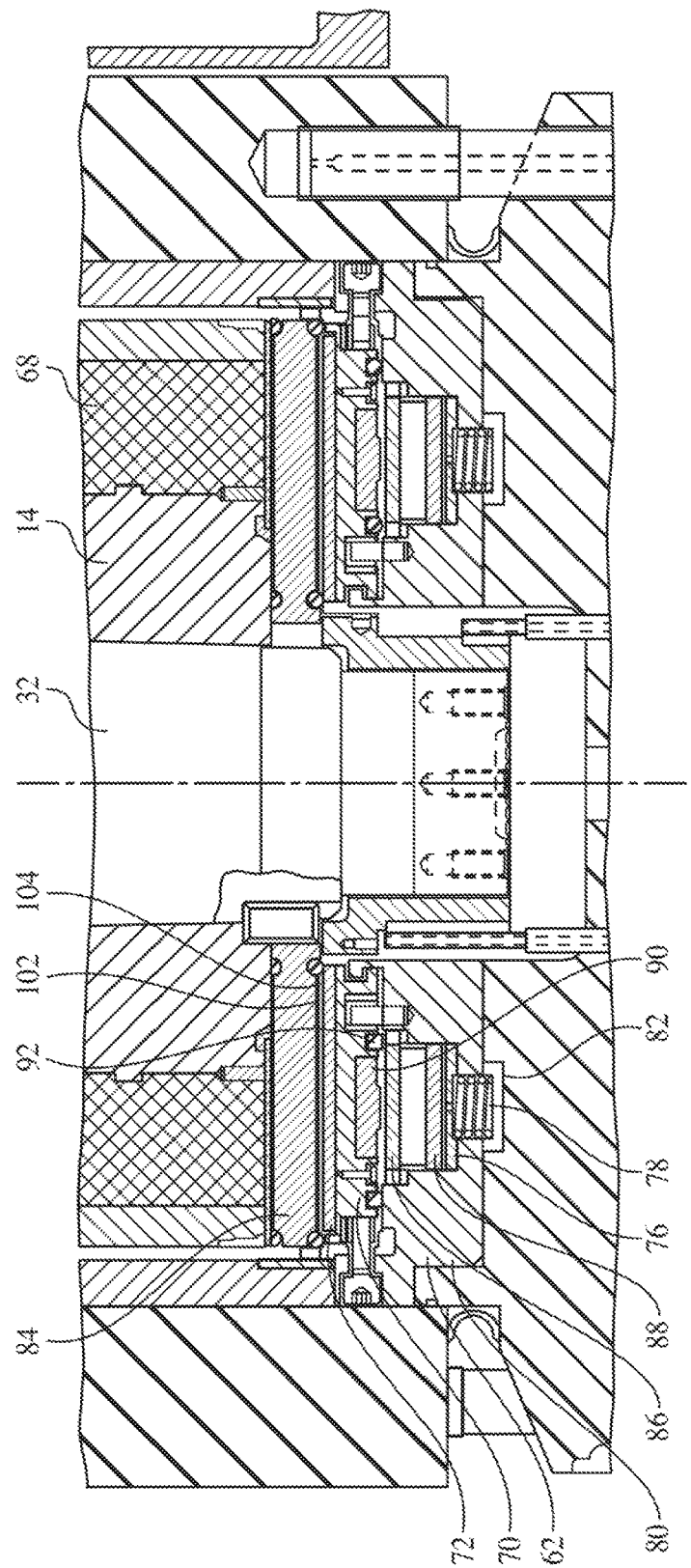
FIG. 2 is close-up, partial cross-section of the lower flywheel and lower thrust bearing of FIG. 1.

Referring to FIGS. 1 and 2, upper flywheel 12 is disposed proximate to the impeller 24 end of the pump 10 coupled to shaft 32 within the pump casing 16. Lower flywheel 14 is disposed on the other end of shaft 32 in opposed relation to the upper flywheel 12 coupled to the shaft 32 within the pump stator assembly 18. Upper flywheel 12 and lower flywheel 14 include high density segments 68. The high density segments 68 may be formed from a tungsten based alloy. Other high density materials, however, are suitable. Disposed on an upper side and a lower side of lower flywheel 14 are an upper thrust bearing assembly 60 and a lower thrust bearing assembly 62. A thrust runner 84 is disposed in between the lower flywheel 14 and the upper thrust bearing assembly 60 and in between the lower flywheel 14 and the lower thrust bearing assembly 62. A hard face material 102 is integral with the thrust runner 84 operating face disposed to the upper thrust bearing assembly 60 and lower thrust bearing assembly 62.

Figure 3:
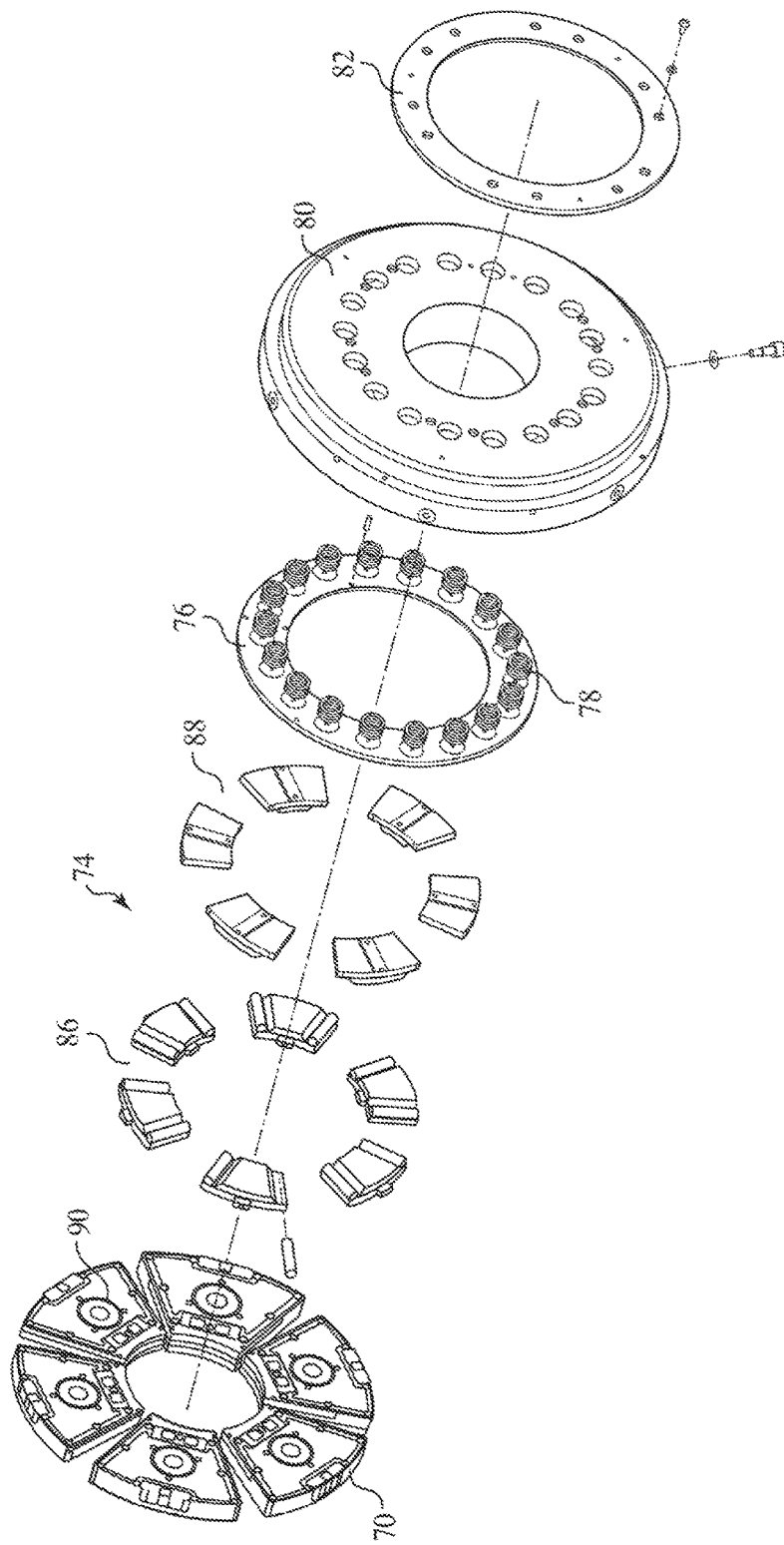
FIG. 3 is an exploded view of the lower thrust bearing assembly of FIG. 2.
Figure 4:
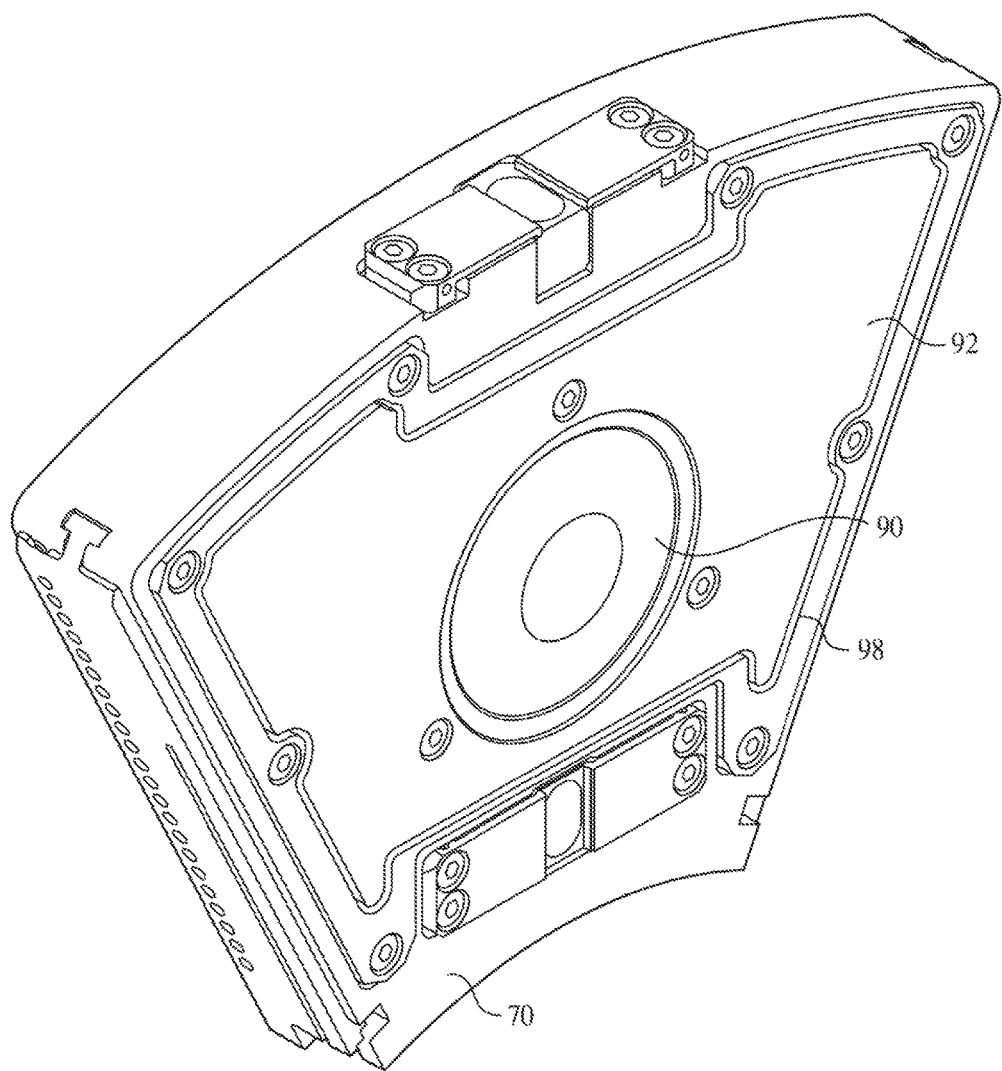
FIG. 4 is a perspective view of a thrust shoe holder and heat shield according to an embodiment of the invention.
Figure 5:
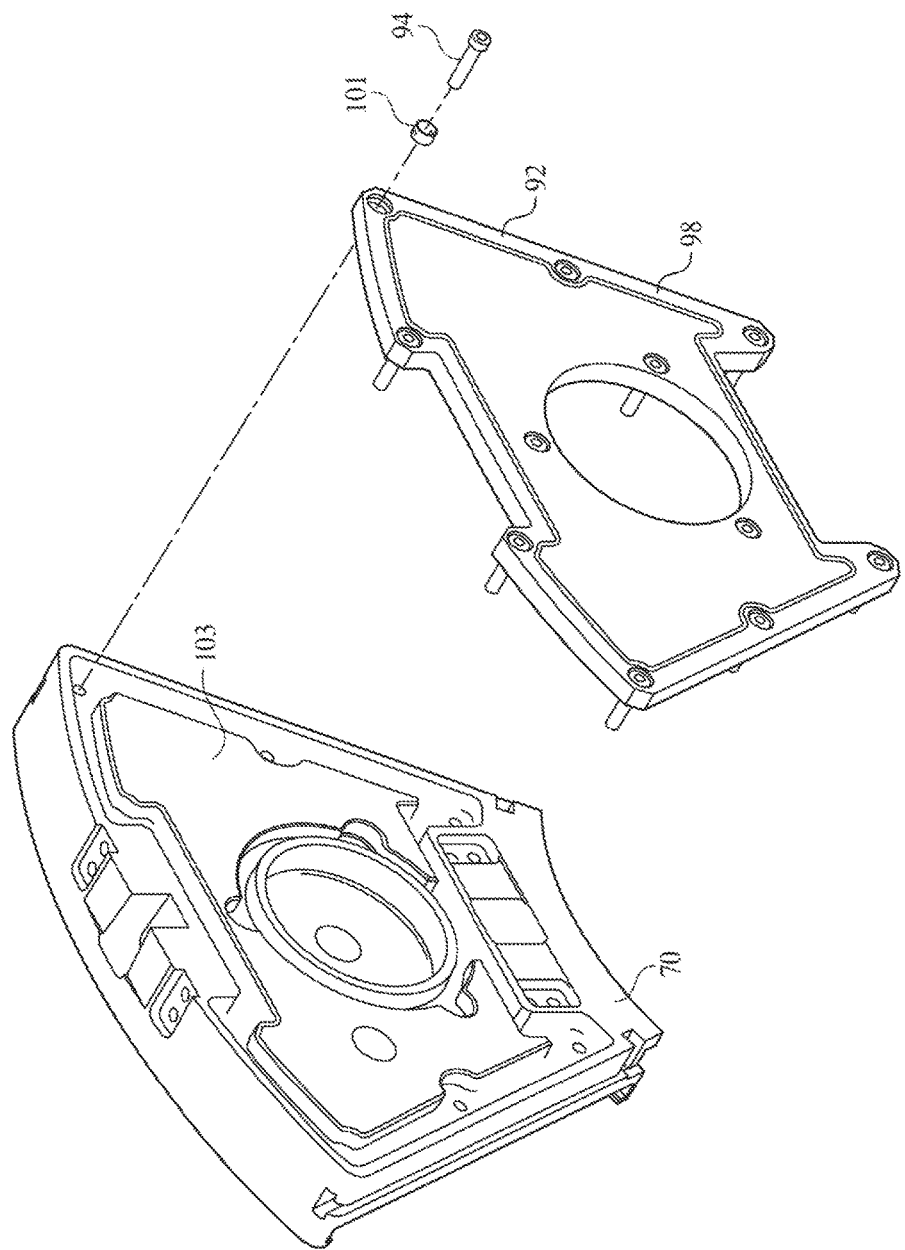
FIG. 5 is an exploded view of the thrust shoe holder and heat shield of FIG. 4.
Figure 6:
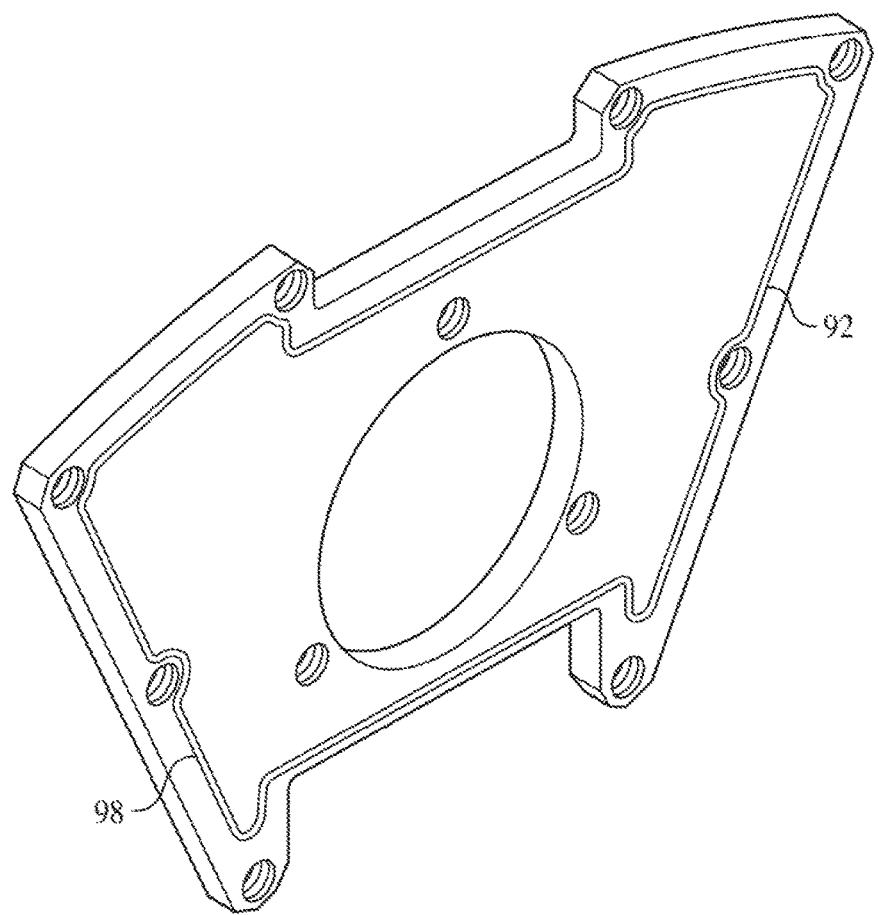
FIG. 6 is a front view of the heat shield of FIG. 4.
Figure 7:
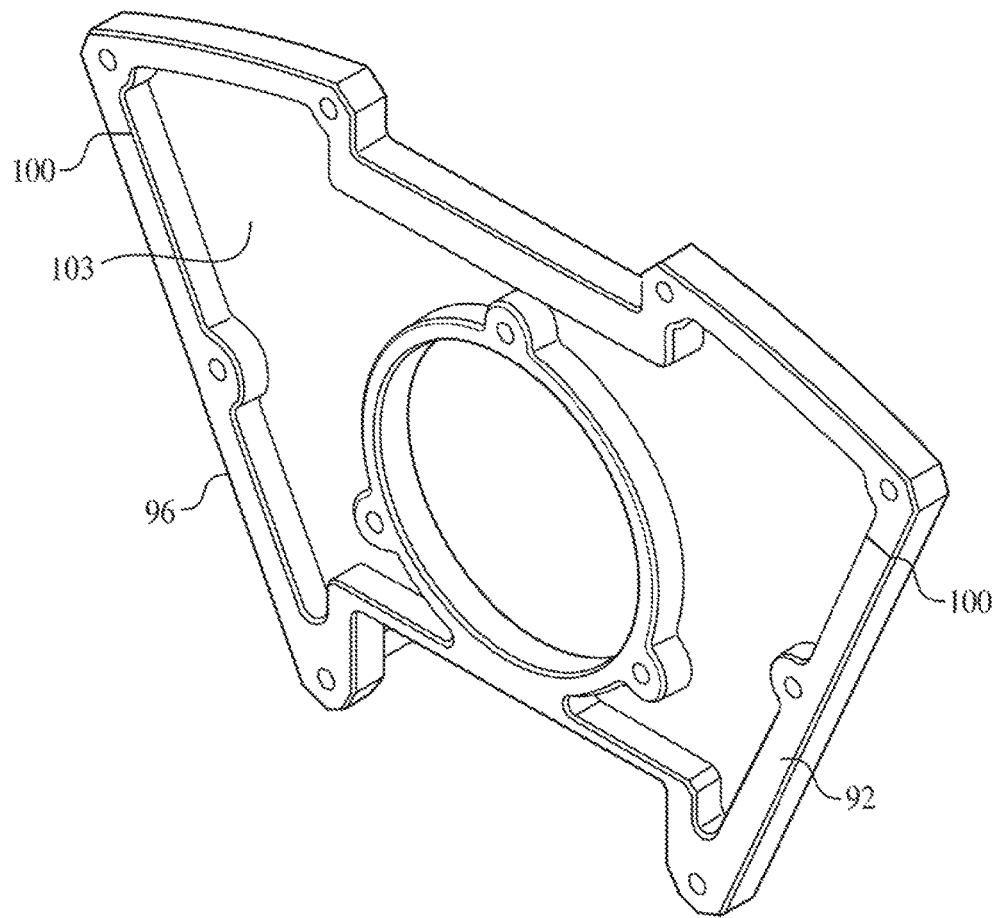
FIG. 7 is a back view of the heat shield of FIG. 4.

Referring to FIGS. 2 and 3, upper thrust bearing assembly 60 and a lower thrust bearing assembly 62 are disposed about rotatable shaft 32. Thrust bearing assembly 62 includes a thrust shoe holder 70, wedge-shaped thrust shoes 72, a linkage assembly 74, a retaining ring 76, a biasing member 78, a lower thrust bearing housing 80, and a housing floor ring or plate 82. Thrust shoe holder 70 is disposed in between a thrust runner 84 and the linkage assembly 74 comprising upper leveling link 86 and lower leveling link 88. Each thrust shoe has a central pivot 90. Biasing member 78 applies a force on lower thrust bearing 62 during certain operating conditions. The lower flywheel 14 and thrust runner 84 with hard face material 102 are coupled to the shaft 32 to rotate with the shaft 32, while the lower thrust bearing assembly 62, retaining ring 76 and biasing member 78 do not rotate with shaft 32. Lower thrust bearing assembly 62 is water lubricated. When shaft 32, thrust runner 84, and hard face material 102 rotate, a water lubricating film 104 forms between the thrust bearing hard face material 102 and the thrust shoes 72 from hydrodynamic action.

Referring to FIGS. 4-7, lower thrust bearing assembly 62 further includes a heat shield 92 made of the same stainless steel material as the thrust shoe holder 70. Heat shield 92 insulates the back side of thrust shoe holder 70 to mitigate the temperature gradient occurring through the thickness of thrust shoe holder 70. Heat shield 92 traps a layer of stagnant water 103 between the heat shield 92 and the back side of thrust shoe holder 70. This layer of stagnant water 103 acts as a layer of insulation to mitigate the temperature gradient through the thickness of the thrust shoe holder 70 and thus minimizes or eliminates the distortion during thermal transient events. The thickness of the stagnant water layer 103 is adjusted to provide sufficient insulating capability while reducing the potential for free convection to develop in the stagnant water layer.

The heat shield 92 is attached to the back side of the thrust shoe holder 70 by mechanical fasteners 94 (FIG. 5) locked in place with lock cups 101. The perimeter of the heat shield 92 is made rigid to form a raised flange 96 (FIG. 7) that will seal with the back surface of the thrust shoe holder 70 and create a cavity between the back surface of the thrust shoe holder 70 and an inner surface of heat shield 92. The back surface of the thrust shoe holder 70 has features machined to interface with the heat shield perimeter flange 96 and fastener 94 locations. The heat shield perimeter flange 96 may be attached by fasteners 94 or allowed to slide against the thrust shoe holder surface to further reduce distortion. A flex joint groove 98 (FIG. 5) machined into the heat shield 92 near the heat shield perimeter flange 96 must be added to the heat shield 92 if perimeter flange fasteners 94 are used. This flex joint groove 98 limits the amount of force transmitted from the heat shield 92 thermal expansion to the thrust shoe holder 70 to mitigate the influence of heat shield 92 distortion on the net distortion of shoe holder 70. Small weep holes 100 (FIG. 7) are added to the heat shield perimeter flange 96 to allow the stagnant water layer 103 to automatically fill in the water-flooded reactor coolant pump 10. The weep holes 100 are small enough to prevent active flow of the circulating bearing water under the heat shield 92 that would degrade the stagnant water layer 103 insulating property.

Although the present invention has been described in detail for the purpose of illustration, it is to be understood that such detail is solely for that purpose and that variations can be made therein by those in the art without departing from the spirit and scope of the invention.

What is claimed is:

1. A heat shield for a thrust bearing assembly comprising:
   a member having an inner surface and an outer surface;
   a raised flange formed on a perimeter of the inner surface, wherein the raised flange is configured to seal with a back surface of a thrust shoe holder, and form a cavity between the inner surface and the back surface of the thrust shoe holder;
   at least one weep hole on the flange, wherein the at least one weep hole is configured to allow water to enter the cavity to form an insulating stagnant water layer.

2. The heat shield of claim 1, further comprising a flex joint groove disposed on a perimeter of the outer surface.

3. A flywheel assembly for a pump, the flywheel comprising:
   a flywheel configured to rotate about an axis of rotation;
   an upper thrust bearing assembly disposed on an upper side of the flywheel;
   a lower thrust bearing assembly disposed on a lower upper side of the flywheel;
   a thrust runner disposed in between the flywheel and the lower thrust bearing assembly;
   wherein the lower thrust bearing includes a heat shield comprising:
      a member having an inner surface;
      a raised flange formed on the perimeter of the inner surface, wherein the raised flange is configured to seal with a back surface of a thrust shoe holder, and form a cavity between the inner surface and the back surface of the thrust shoe holder;
      at least one weep hole on the flange, wherein the at least one weep hole is configured to allow water to enter the cavity to form an insulating stagnant water layer.

4. The flywheel assembly of claim 3, wherein the flywheel comprises a plurality of high density segments.

5. The flywheel assembly of claim 3, wherein the lower thrust bearing assembly comprises a thrust shoe holder; and a plurality of thrust shoes held by the thrust shoe holder.

6. The flywheel assembly of claim 5, wherein the thrust runner includes a thrust bearing hard face material on a lower surface of the thrust runner.

7. The flywheel assembly of claim 6, further comprising a lubricating film between the hard face material and the plurality of thrust shoes.

8. The flywheel assembly of claim 5, wherein the lower thrust bearing assembly further comprises a linkage assembly disposed below the thrust shoe holder.

9. The flywheel assembly of claim 8, wherein the linkage assembly comprises an upper leveling link and a lower leveling link.

10. The flywheel assembly of claim 8, wherein the lower thrust bearing assembly further comprises a retaining ring disposed below the linkage assembly.

11. The flywheel assembly of claim 10, wherein the retaining ring has a plurality of biasing members disposed thereon.

12. The flywheel assembly of claim 11, wherein lower thrust bearing assembly further comprises a thrust bearing housing and a housing floor ring disposed in the thrust bearing housing.

13. A pump comprising:
   a shaft being configured to rotate about an axis of rotation;
   an impeller mounted on the shaft;
   a motor engaged with the shaft for turning the impeller;
   a first flywheel configured to rotate with the shaft;
   an upper thrust bearing assembly disposed on an upper side of the first flywheel;
   a lower thrust bearing assembly disposed on a lower upper side of the first flywheel;
   a thrust runner disposed in between the flywheel and the lower thrust bearing assembly;
   wherein the lower thrust bearing includes a heat shield comprising:
      a member having an inner surface;
      a raised flange formed on the perimeter of the inner surface, wherein the raised flange is configured to seal with a back surface of a thrust shoe holder, and form a cavity between the inner surface and the back surface of the thrust shoe holder;
      at least one weep hole on the flange, wherein the at least one weep hole is configured to allow water to enter the cavity to form an insulating stagnant water layer.

14. The pump of claim 13, wherein the flywheel comprises a plurality of high density segments.

15. The pump of claim 13, wherein the lower thrust bearing assembly comprises a thrust shoe holder; and a plurality of thrust shoes held by the thrust shoe holder.

16. The pump of claim 15, wherein the thrust runner includes a thrust bearing hard face material on a lower surface of the thrust runner.

17. The pump of claim 16, further comprising a lubricating film between the hard face material and the plurality of thrust shoes.

18. The pump of claim 15, wherein the lower thrust bearing assembly further comprises a linkage assembly disposed below the thrust shoe holder.

19. The pump of claim 18, wherein the linkage assembly comprises an upper leveling link and a lower leveling link.

20. The pump of claim 18, wherein the lower thrust bearing assembly further comprises a retaining ring disposed below the linkage assembly.

21. The pump of claim 20, wherein the retaining ring has a plurality of biasing members disposed thereon.

22. The pump of claim 21, wherein lower thrust bearing assembly further comprises a thrust bearing housing and a housing floor ring disposed in the thrust bearing housing.

* * * * *